United States Patent
Higashi

(10) Patent No.: US 7,181,458 B1
(45) Date of Patent: Feb. 20, 2007

(54) DISK SYSTEM AND METHOD OF UPDATING FIRMWARE

(75) Inventor: Masato Higashi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/673,628

(22) PCT Filed: Feb. 15, 2000

(86) PCT No.: PCT/JP00/00812

§ 371 (c)(1),
(2), (4) Date: Dec. 8, 2000

(87) PCT Pub. No.: WO00/51003

PCT Pub. Date: Aug. 31, 2000

(30) Foreign Application Priority Data

Feb. 23, 1999 (JP) .................. 11-044366

(51) Int. Cl.
G06F 17/00 (2006.01)
G06F 7/00 (2006.01)
(52) U.S. Cl. ............... 707/100; 707/200; 707/204
(58) Field of Classification Search ............ 707/3, 707/104.1, 100, 200, 201, 203, 204; 711/103, 711/100, 114; 713/100; 717/10
See application file for complete search history.

(56) References Cited

U.S. PATENT DOCUMENTS

| | | | | |
|---|---|---|---|---|
| 5,689,640 A | * | 11/1997 | Okanoue | 709/221 |
| 5,826,075 A | * | 10/1998 | Bealkowski et al. | 711/103 |
| 6,192,448 B1 | * | 2/2001 | Mansur | 711/112 |
| 6,199,194 B1 | * | 3/2001 | Wang et al. | 717/118 |
| 6,209,060 B1 | * | 3/2001 | Machida | 711/114 |
| 6,237,091 B1 | * | 5/2001 | Firooz et al. | 713/100 |
| 6,253,281 B1 | * | 6/2001 | Hall | 711/103 |
| 6,266,809 B1 | * | 7/2001 | Craig et al. | 717/10 |
| 6,675,258 B1 | * | 1/2004 | Bramhall et al. | 711/114 |

FOREIGN PATENT DOCUMENTS

| | | |
|---|---|---|
| JP | 1-242457 | 9/1989 |
| JP | 9-152941 | 6/1997 |
| JP | 10-154121 | 6/1998 |

* cited by examiner

Primary Examiner—Sam Rimell
(74) Attorney, Agent, or Firm—McDermott Will & Emery LLP

(57) ABSTRACT

In a disk system having a plurality of disks, an update program for updating the firmware is incorporated into a computer of the disk system, the update program is started automatically by turning on the power source of the disk system or manipulating an operation panel, the firmware of the latest version of disk devices is stored in a RAM, and the firmware stored in the RAM transmitted to disk devices having a former version, and the firmware is updated.

12 Claims, 3 Drawing Sheets

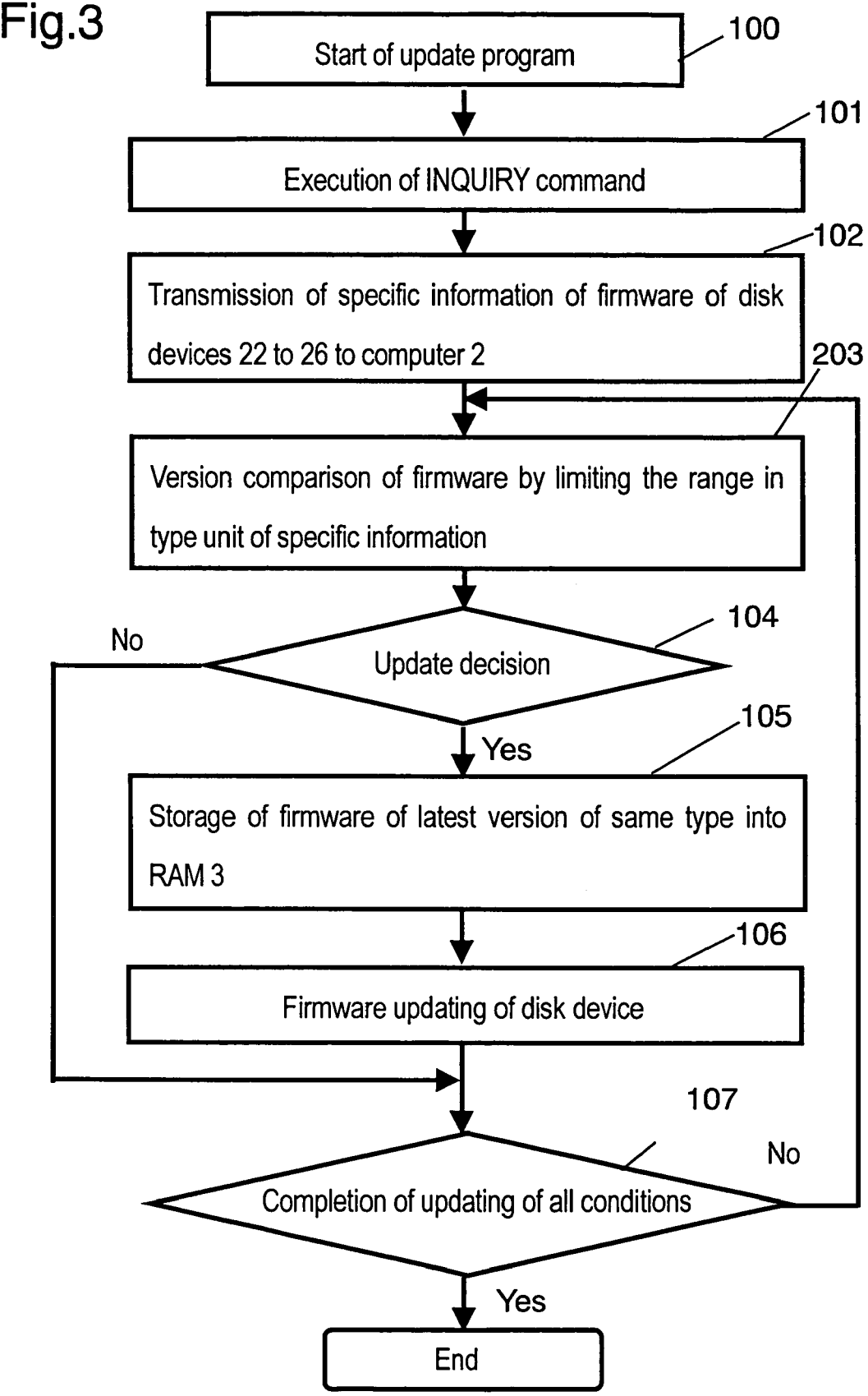

DISK SYSTEM AND METHOD OF UPDATING FIRMWARE

TECHNICAL FIELD

The present invention relates to a disk system comprising a plurality of disk devices and capable of updating the firmware of the disk devices, and a firmware updating method thereof.

BACKGROUND ART

Computer peripheral devices such as CD-ROM, CD-R, HDD (hard disk device) and other disk devices have an electrically erasable and programmable read-only memory (EEPROM) in which a program known as firmware for controlling the disk devices is stored. Version updating or bug correction of firmware in the disk devices is executed by updating the firmware in the EEPROM.

In the case these disk devices are general-purpose devices, generally, the computer updates the firmware as follows.

An update firmware is taken into the HDD of the computer through floppy disk or the Internet.

A disk device is designated, and the update firmware is transmitted.

The disk device receives the update firmware, and writes it into the EEPROM.

However, if there are plural disk devices of a same type, the disk device to be updated must be correctly designated.

If the firmware of a wrong disk device is updated, this disk device may fail to function normally.

On the other hand, in the case of a system composed of non-general disk devices, for example, in the case of jukebox or auto-changer, it is not easy to supply a new firmware from outside.

For this purpose, the update firmware is supplied into the disk device by using a special tool, or the disk device is dismounted from the system, and connected to a different computer, and the firmware is updated in each device.

As a result, the firmware updating is a complicated job, and in the case of a plurality of disk devices, each device must be dismounted and updated in order to update the same firmware.

SUMMARY OF THE INVENTION

The invention is intended to solve these problems, and it is hence an object thereof to present a disk system for updating the firmware of plural disk devices used as computer peripheral devices automatically, and a method of updating the firmware.

To achieve the object, the disk system of the invention comprises a computer composed of a plurality of disk devices having a first memory storing the firmware, and an update program for updating the specific information of the firmware of disk devices and the firmware data.

The firmware updating method of the invention is applied in the disk system comprising a computer composed of a plurality of disk devices having a first memory storing the firmware, and an update program for updating the specific information of the firmware of disk devices and the firmware data, comprising a starting step of starting the update program, a storing step of storing the firmware of one of the disk devices into a second memory connected to the computer, and an updating step of transmitting the firmware stored in the second memory to the disk devices to be updated out of the disk devices, and updating to the firmware stored in the second memory.

BRIEF DESCRIPTION OF THE DRAWINGS

FIG. 3 is a flowchart showing an example of procedure of other embodiment of the firmware updating method in the disk system in FIG. 1.

DESCRIPTION OF THE PREFERRED EMBODIMENT

First Exemplary Embodiment

Figure 1:
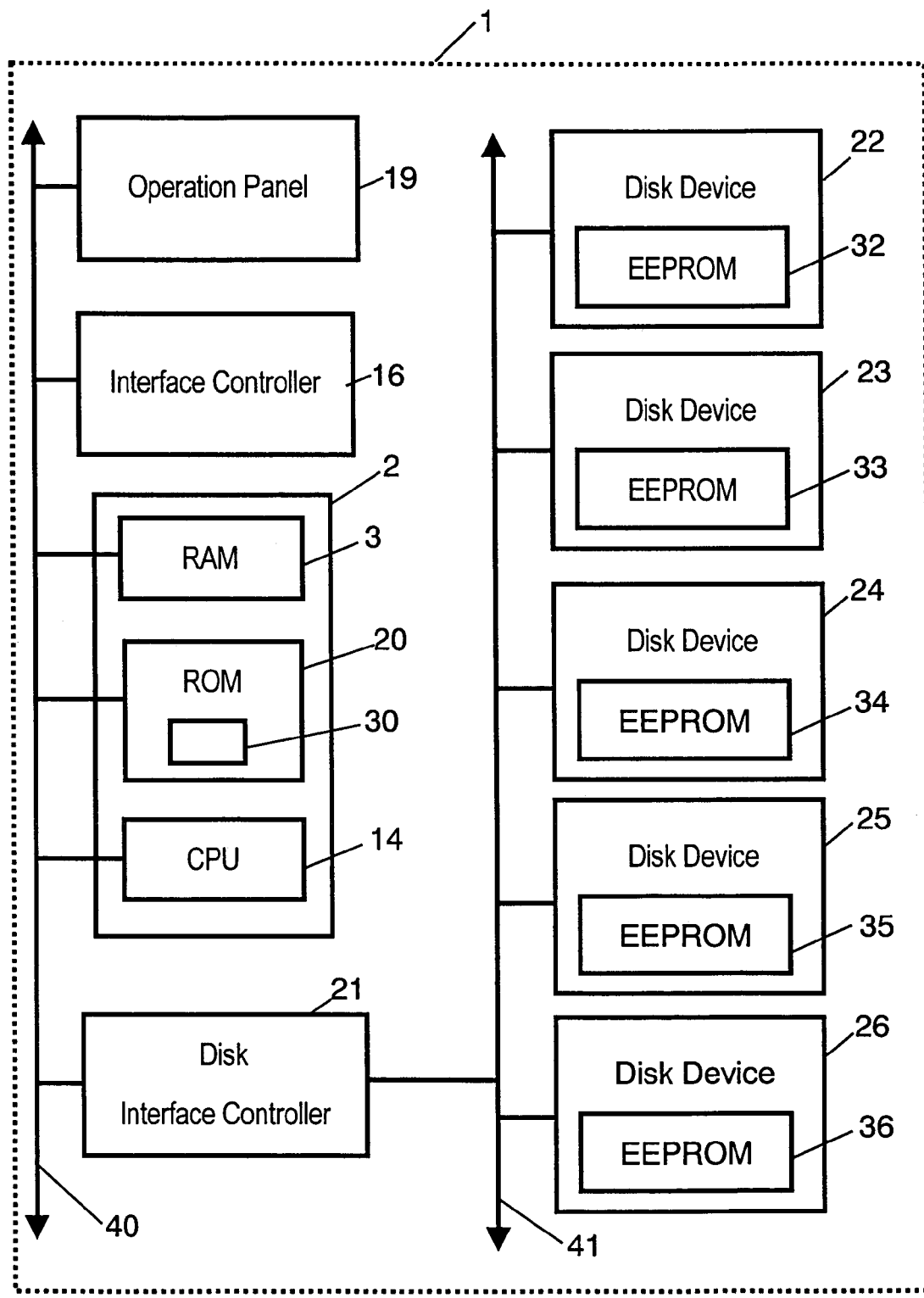
FIG. 1 is a block diagram showing a basic configuration of a disk system in an embodiment of the present invention.
Figure 2:
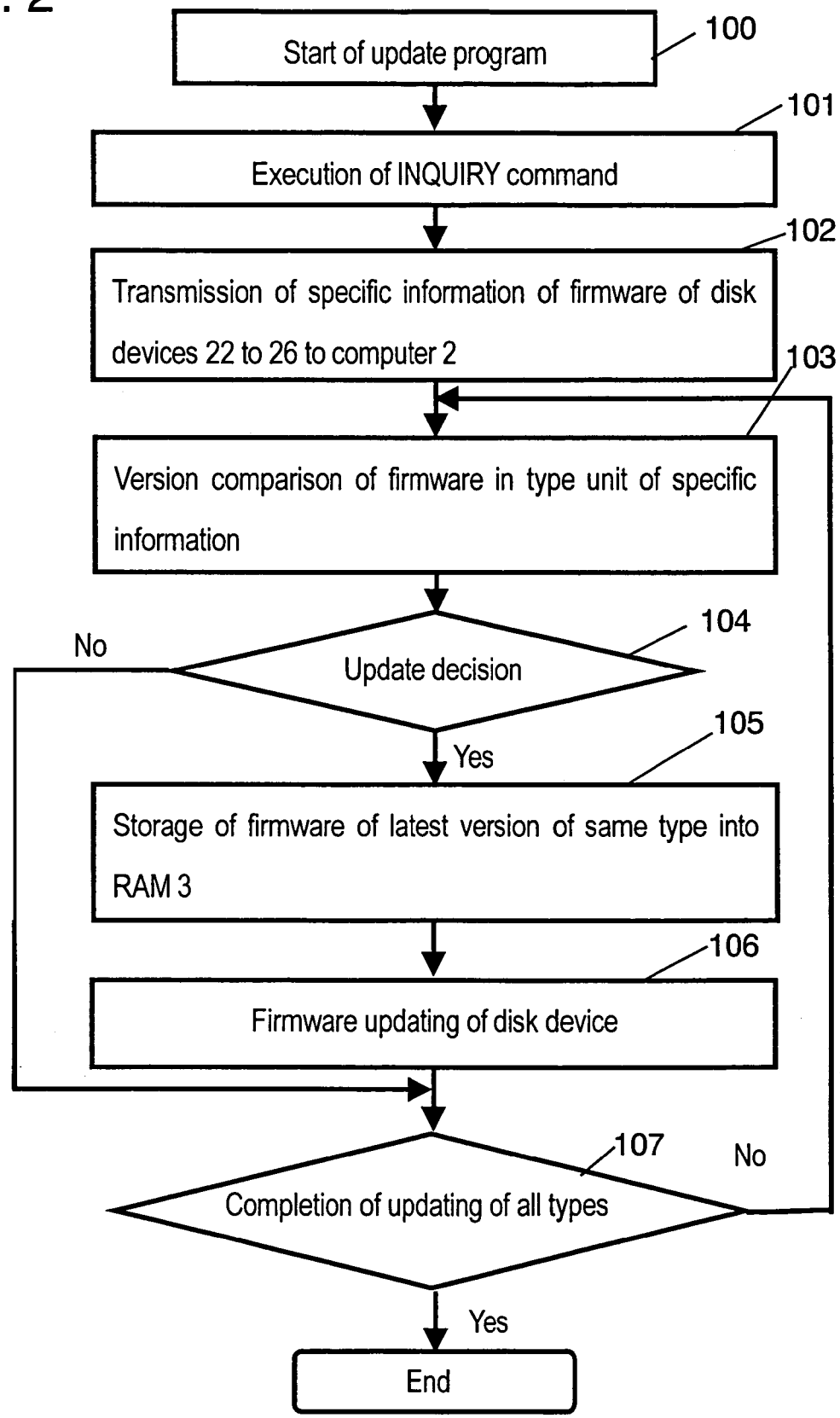
FIG. 2 is a flowchart showing an example of procedure of an embodiment of the firmware updating method in the disk system in FIG. 1.

The firmware updating system and its updating method in first exemplary embodiment of the present invention are described by referring to FIG. 1 and FIG. 2.

FIG. 1 is a block diagram showing a basic configuration of a disk system in an embodiment of the present invention. In FIG. 1, a disk system 1 comprises a computer 2, an operation panel 19, an interface controller 16, a disk interface controller 21, disk devices 22 to 26, a first bus 40, and a second bus 41.

The computer 2 comprises a CPU 14 for executing the intended control of the system, a second memory 3 (hereinafter called RAM 3) for temporarily storing necessary data for control, and a ROM 20 for storing a necessary command for control of the disk system 1. In part of the ROM 20, an update program 30 for updating the firmware of the disk devices is stored.

The first bus 40 couples with the CPU 14, RAM 3, ROM 20, operation panel 19, interface controller 16, and disk interface controller 21. The second bus 41 couples with the disk interface controller 21, and disk devices 22 to 26.

The interface controller 16 realizes a two-way data communication with the computer 2, operation panel 19, and disk devices 22 to 26. The disk interface controller 21 performs a two-way data communication with the computer 2 and disk devices 22 to 26.

The disk devices 22 to 26 include first memories 32 to 36 which are electrically erasable and programmable read-only memories (EEPROM 32 to 36). Each of the EEPROM 32 to 36 stores specific information such as a model name for designating the type of disk device, its revision number showing the version, and its firmware data such as program for controlling the disk device.

By the manipulation of the operation panel 19 or by turning on the power source of the disk system 1, the computer 2 starts the update program 30. Further, the computer 2 receives the specific information of the firmware stored in the EEPROM 32 to 36, and compares the specific information.

As the result of the comparison, the firmware of the latest version of the same type is stored in the RAM 3 through the disk interface controller 21. The firmware stored in the RAM 3 is transmitted to the disk device designated as a result of comparison, and the firmware of the specific EEPROM is updated to the transmitted firmware.

In this embodiment, on the basis of the comparison result of the specific information of the firmware, the firmware of the latest version is stored in the RAM 3. On the other, when an operator recognizes the disk device having the firmware of the latest version, the firmware can be stored in the RAM 3 by input of the device name of the disk device in the operation panel 19.

The disk devices 22 to 26 are generally optical disk devices such as DVD-ROM, CD-ROM, and CD-R. In this embodiment, the disk devices 22 to 24 are DVD-ROM devices, and the disk devices 25 and 26 are CD-ROM devices. The updating method in this embodiment will be more specially explained below in the case of the specific information of the disk devices as shown in Table 1.

TABLE 1

|  | Specific information |
| --- | --- |
| Disk device 22 | DV2.00 |
| Disk device 23 | DV1.50 |
| Disk device 24 | DV1.00 |
| Disk device 25 | CD1.50 |
| Disk device 26 | CD1.50 |

The first two letters of the specific information in Table 1 refer to the model name designating the type. Numerals following the model names are revision number showing the version, and the larger number indicates the newer version.

The operation is explained below by referring to FIG. 2.

FIG. 2 is a flowchart showing an example of procedure of an embodiment of the firmware updating method in the disk system in FIG. 1.

Step 100 is a starting step, where the update program 30 is started up automatically by turning on the power source of the disk system 1, or by manipulation of the operation panel 19.

Step 101 is to execute an INQUIRY command defined in SCSI or ATAPI Standard of disk device.

After execution of step 101, at step 102, all disk devices 22 to 26 transmit the specific information of each firmware to the computer 2.

At step 103, the computer 2 recognizes the type of the transmitted specific information, and compares the version of the same type. That is, it is recognized that the type of the disk devices 22, 23, 24 is the DV, and the type of the disk devices 25 and 26 is the CD. Further comparing the version of the type DV, it is recognized that the revision number of the disk 22 is newer than the version of the disk devices 23, 24.

Step 104 is to judge presence or absence of the disk device to be updated of the firmware as a result of step 103. The version of the disk device 23, 24 of which type is DV is different from the version of the disk device 22, and it is judged necessary to update the firmware of the disk device 23, 24 with the firmware of the disk device 22.

As a result, going to a storing step of 105, the computer 2 commands transmission of the firmware to the disk device 22 which has the latest version of the disk devices of type DV, and stores this firmware in the RAM 3.

Consequently, at an updating step of 106, the firmware stored in the RAM 3 is transferred to the disk devices 23, 24 to be updated through the disk interface controller 21, and the disk devices 23, 24 update the firmware.

Next, at step 107, it is judged that comparison of versions of disk devices of type CD and update decision are not finished, and the process returns to step 103.

At step 103, the versions of the disk devices 25, 26 are compared, and it is recognized that the versions are the same.

At step 104, since the versions of the disk devices 25, 26 are the same, it is judged that updating of firmware is not necessary, and the process skips to step 107.

At step 107, it is recognized that judgement of step 104 is executed on all types, and the update program is terminated.

Second Exemplary Embodiment

A second exemplary embodiment of the present invention is described hereinafter by referring to FIG. 3.

FIG. 3 is a flowchart showing an example of procedure of other embodiment of the firmware updating method in the disk system in FIG. 1. In FIG. 3, same steps as in FIG. 2 are identified with same step numbers as in FIG. 2.

This embodiment is a method of limiting the version range in the disk devices of same type, and updating to the latest version in the limited range. In both types DV and CD, limiting the version range, that is, the revision number range from 1.00 to 1.99, the updating method is explained below.

At step 203, the computer 2 recognizes types of the transferred specific information, and compares the versions within the revision number range of the same type. It is first recognized that the type of the disk devices 22, 23, 24 is the DV, and the type of the disk devices 25 and 26 is the CD. Since the revision number range of type DV is limited within 1.00 to 1.99, the versions of the disk devices 23, 24 which are within this range are compared. As a result, it is recognized that the version of the firmware of the disk device 23 is the latest version.

At step 104, it is judged whether the disk device having the firmware to be updated is present or not as the result of step 203. Of the same type DV, since the version of the disk device 24 is different from the version of the disk device 23, it is judged necessary to update the firmware of the disk device 24 with the firmware of the disk device 23.

As a result, going to step 105, the computer 2 commands transmission of the firmware to the disk device 23 having the latest version of the disk devices in the version range of 1.00 to 1.99 of type DV and stores this firmware in the RAM 3.

At step 106, the firmware stored in the RAM 3 is transferred to the disk device 24 to be updated through the disk interface controller 21, and the disk device 24 updates the firmware.

Next, at step 107, it is judged that comparison of versions of disk devices of type CD and update decision are not finished, and the process returns to step 203.

At step 203, the versions of the disk devices 25, 26 are compared, and it is recognized that the versions are the same in the range of 1.00 to 1.99.

At step 104, since the versions of the disk devices 25, 26 are the same, it is judged that updating of firmware is not necessary, and the process goes to step 107.

At step 107, it is recognized that judgement of step 104 is executed for all types, and the update program is terminated.

In the second exemplary embodiment thus explained, the limiting version range can be previously registered in the ROM 20 in which the firmware update program is stored. It is also possible to store the limiting version range in a specific region of the new firmware used in updating, and judge by designating the condition.

In the devices of the same type, if the version cannot be updated because they are not compatible at the host side, this method is effective.

In the first and second embodiments, the specific information of the disk devices 22 to 26 are transferred to the computer 2, but if the specific information is preliminarily managed in the computer 2, such transfer of specific information can be omitted.

Further, in the first and second exemplary embodiments, the firmware of the latest version is stored in the RAM 3, and the firmware is transmitted to the disk device and the firmware is updated, and the scope of the invention also includes the constitution of storing the firmware data of the latest version in the RAM 3, transmitting the firmware data and the specific information transferred to the computer or managed preliminarily to the disk devices, and updating the firmware.

INDUSTRIAL APPLICABILITY

As described above, by incorporating the program for updating the firmware data integrally in the computer, and utilizing the firmware updating method, the firmware of a plurality of disk devices can be automatically updated without requiring any particular hardware, and with no help or little help of the operator. For example, when one disk device is replaced, the firmware of other disk can be easily updated by starting the update program.

Thus, without possibility of wrong judgement by the operator, the firmware can be updated correctly, and in particular the firmware of the jukebox or auto-changer of which updating is difficult can be easily updated automatically.

What is claimed is:

1. A disk system, comprising:
   a computer composed of a plurality of disk devices, each having a first memory storing a firmware, and
   an update program for updating specific information and firmware data of the firmware of said disk devices,
   wherein said computer operates to compare a parameter of the firmware stored in said first memories with each other in order to store a firmware of one of said plurality of disk devices in a second memory,
   wherein firmware of another one of said plurality of disk devices is updated from the firmware stored within said another one of said plurality of disk devices prior to an update to the firmware stored in the second memory.

2. The disk system of claim 1, wherein the update program updates the specific information and firmware data of the firmware of said disk devices in response to turning on a power source of the disk system.

3. A firmware updating method applied in a disk system comprising a computer composed of a plurality of disk devices each having a first memory storing firmware, and an update program for updating specific information and firmware data of the firmware of said plurality of disk devices, comprising:
   a starting step of starting said update program;
   a comparing step of comparing a version of the firmware in the first memory with each other;
   a first transmitting step of transmitting a firmware from the first memory of the one of said plurality of disk devices into a second memory coupled to said computer according to a result of the comparing, and;
   a second transmitting step of transmitting the firmware stored in said second memory to another one of said plurality of disk devices, and the firmware of said another one of said plurality of disk devices is updated from the firmware stored within said another one of said plurality of disk devices prior to an update to the firmware stored in said second memory.

4. The firmware updating method of claim 3, wherein
   each of said specific information is composed of a model name designating type of each of the plurality of disk devices, and a revision number showing the version of the firmware, and;
   the firmware stored in said second memory is a firmware of a disk device having a latest revision number among said plurality of disk devices.

5. The firmware updating method of claim 3, wherein
   each of said specific information is composed of a model name designating type of each of the plurality of disk devices, and a revision number showing a version of the firmware;
   said firmware stored in the second memory is a firmware of a disk device having a latest revision number among disk devices having same model name of said specific information and different revision numbers among said plurality of disk devices, and;
   said another one of said disk devices is a disk device having the same model name as the firmware stored in said second memory and different revision number from the firmware stored in said second memory.

6. The firmware updating method of claim 3, wherein
   each of said specific information is composed of a model name designating type of each of the plurality of disk devices, and a revision number showing a version of the firmware;
   said firmware stored in the second memory is a firmware of a disk device having a latest revision number among disk devices having version number in a specified revision number range and same model name of said specific information among said plurality of disk devices, and;
   said another one of said disk devices is a disk device having version number in said specified revision number range, and having the same model name as the specific information stored in said second memory.

7. The firmware updating method of claim 3, wherein
   each of said specific information is composed of a model name designating type of each of the plurality of disk devices, and a revision number showing a version of the firmware;
   said firmware stored in the second memory is a firmware of a disk device having a latest revision number among disk devices having same model name of said specific information and different revision numbers in a specified revision number range among said plurality of disk devices, and;
   said another one of said disk devices is a disk device having the same model name as the firmware stored in said second memory and different revision number in said specified revision number range.

8. The firmware updating method of any one of claims 3, 4, 5, 6, and 7:
   wherein said starting step is to start up said update program automatically when the power source of the disk system is turned on.

9. The firmware updating method of claim 3, wherein the starting step of starting said update program is performed in response to turning on a power source of the disk system.

10. The firmware updating method of claim 3, further comprising a comparing step of comparing a parameter of the firmware of the one of said plurality of disk devices to a parameter of the firmware of the disk device to be updated.

11. A disk system, comprising:
   a computer composed of a plurality of disk devices each having a first memory storing a firmware, an update program for updating specific information and firmware data of the firmware of said disk devices, and a second memory for storing a firmware of one of said plurality of disk devices, wherein said computer operates to compare a parameter of the firmware stored in said first memories with each other in order to store the firmware of one of said plurality of disk devices in the second memory, wherein the firmware for storing in the second memory is transmitted to the second memory from the first memory of the one of said plurality of disk devices and thereafter transmitted to another one of said plurality of disk devices so as to update the firmware of said another one of said plurality of disk devices from the firmware stored therein prior to the update to the firmware stored in said second memory.

12. The disk system of claim 11, wherein the update program updates the specific information and firmware data of the firmware of said disk devices in response to turning on a power source of the disk system.

* * * * *